US010598941B1

(12) United States Patent
Chi et al.

(10) Patent No.: US 10,598,941 B1
(45) Date of Patent: *Mar. 24, 2020

(54) DYNAMIC CONTROL OF OPTICAL AXIS LOCATION IN HEAD-MOUNTED DISPLAYS

(71) Applicant: Facebook Technologies, LLC, Menlo Park, CA (US)

(72) Inventors: Wanli Chi, Sammamish, WA (US); Pasi Saarikko, Kirkland, WA (US); Lu Lu, Kirkland, WA (US); Kevin James MacKenzie, Sammamish, WA (US); Yijing Fu, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/399,758

(22) Filed: Apr. 30, 2019

Related U.S. Application Data

(63) Continuation of application No. 15/970,292, filed on May 3, 2018, now Pat. No. 10,345,600.

(Continued)

(51) Int. Cl.
  *G03B 21/14* (2006.01)
  *G02B 27/01* (2006.01)
  (Continued)

(52) U.S. Cl.
  CPC ..... *G02B 27/0172* (2013.01); *G02B 27/0093* (2013.01); *G02B 27/017* (2013.01);
  (Continued)

(58) Field of Classification Search
  CPC ............ G02B 27/0172; G02B 27/0093; G02B 27/0176; G02B 27/0179; G02B 27/0185;
  (Continued)

(56) References Cited

U.S. PATENT DOCUMENTS

| 10,416,766 B1* | 9/2019 | Trail ....................... G06F 3/011 |
| 2017/0068091 A1* | 3/2017 | Greenberg .............. G06F 3/013 |

(Continued)

OTHER PUBLICATIONS

Banks, M.S. et al., "Consequences of Incorrect Focus Cues in Stereo Displays," Society for Information Display, Jul. 2008, pp. 1-6.

(Continued)

*Primary Examiner* — William C. Dowling
(74) *Attorney, Agent, or Firm* — Fenwick & West LLP

(57) ABSTRACT

A head-mounted display (HMD) presented herein comprises an electronic display, an optical assembly with a dynamic optical axis component (DOAC), an eye tracker and a controller. The electronic display is configured to emit image light. The eye tracker is configured to determine a gaze vector of a user wearing the HMD. The DOAC is positioned in front of the electronic display and refracts the image light received from the electronic display. The controller provides emission instructions to the DOAC to dynamically move an optical axis of the DOAC to align the optical axis with the determined gaze vector. The optical assembly directs the image light refracted by the DOAC to an eye box of the HMD corresponding to a location of an eye of the user. An optical error associated with the refracted image light directed to the eye box is reduced.

20 Claims, 9 Drawing Sheets

Related U.S. Application Data

(60) Provisional application No. 62/516,874, filed on Jun. 8, 2017.

(51) Int. Cl.
 *G02B 27/00* (2006.01)
 *G06F 3/01* (2006.01)
 *G02F 1/01* (2006.01)

(52) U.S. Cl.
 CPC ............ *G02F 1/0136* (2013.01); *G06F 3/013* (2013.01); *G02B 2027/0185* (2013.01)

(58) Field of Classification Search
 CPC ..... G02B 27/017; G06F 3/0134; G06F 3/012; G06K 9/00597; G06K 9/00604
 See application file for complete search history.

(56) References Cited

U.S. PATENT DOCUMENTS

| | | |
|---|---|---|
| 2017/0131765 A1 | 5/2017 | Perek et al. |
| 2017/0255015 A1 | 9/2017 | Geng et al. |
| 2018/0239423 A1 | 8/2018 | Mardanbegi et al. |
| 2019/0012540 A1 | 1/2019 | Trail |

OTHER PUBLICATIONS

Bernard, J-B. et al., "The Dependence of Crowding on Flanker Complexity and Target-Flanker Similarity," Journal of Vision, 2011, pp. 1-16, vol. 11, No. 8:1.

Hoffman, D.M. et al., "Vergence-Accommodation Conflicts Hinder Visual Performance and Cause Visual Fatigue," Journal of Vision, 2008, pp. 1-30, vol. 8, No. 3:33.

\* cited by examiner (Real World)

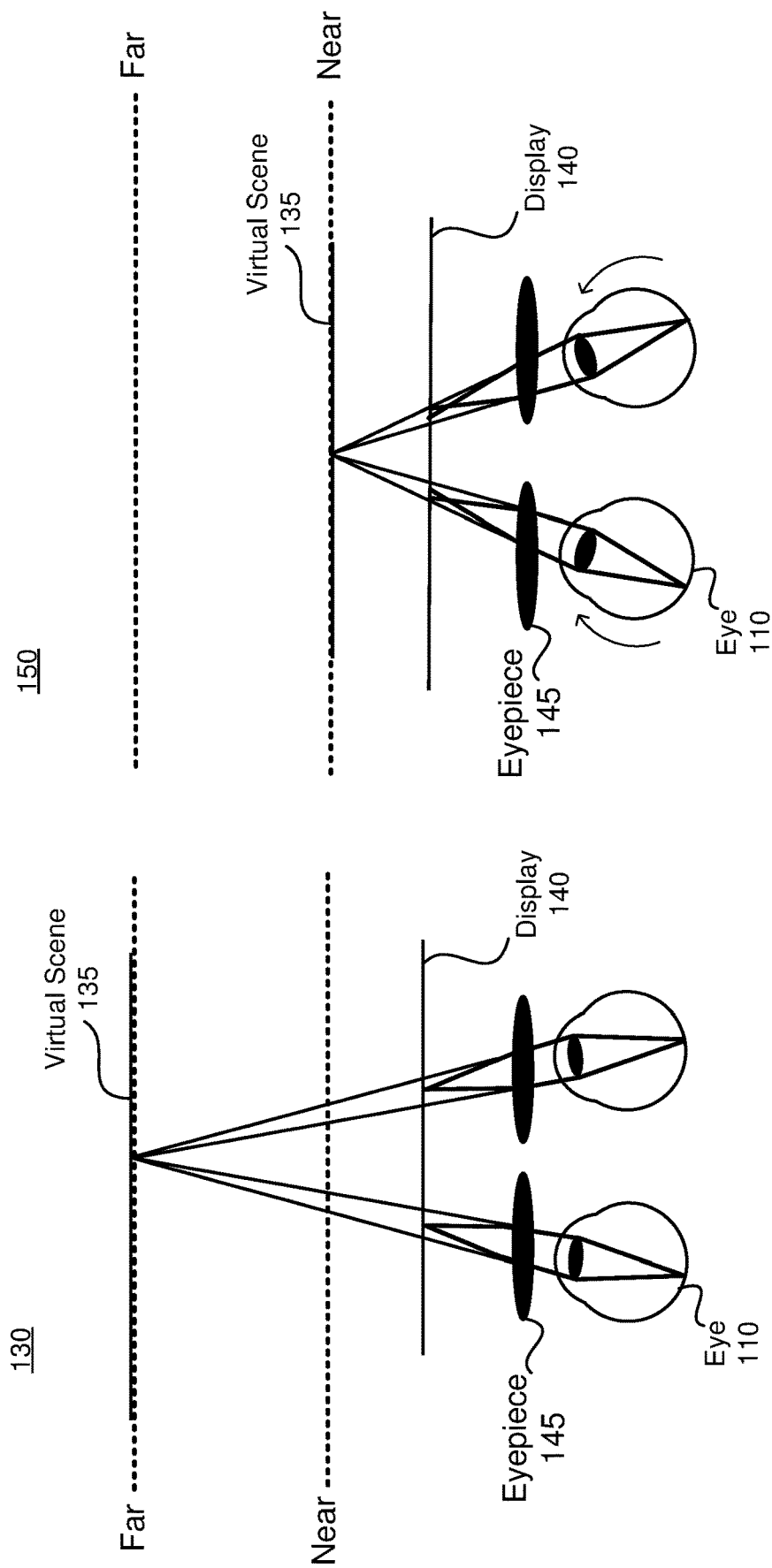

370

380

DYNAMIC CONTROL OF OPTICAL AXIS LOCATION IN HEAD-MOUNTED DISPLAYS

CROSS-REFERENCE TO RELATED APPLICATIONS

This application is a continuation of co-pending U.S. patent application Ser. No. 15/970,292, filed May 3, 2018, which claims the benefit of U.S. Provisional Patent Application Ser. No. 62/516,874, filed Jun. 8, 2017, which are hereby incorporated by reference in their entirety.

BACKGROUND

The present disclosure generally relates to displaying content to a user wearing a head-mounted display (HMD) as part of an artificial reality system, and specifically relates to a dynamic control of optical axis location in HMDs.

Vergence-accommodation conflict is a phenomenon that occurs to users of virtual headsets such as HMDs. Typically, eyes converge (rotate toward one another) to focus on closer objects and diverge (rotate away from one another) to focus on objects that are further away. The vergence therefore represents the simultaneous movement of both eyes in opposite directions to obtain or maintain single binocular vision. Accommodation is coupled with vergence, and is the process where the lenses of the eyes focus on a close or far away object. During accommodation of an eye, a crystalline lens of the eye changes optical power to maintain a clear image or focus on an object as the object's distance varies. In HMD systems, vergence and accommodation processes are decoupled. In fixed-focused HMD systems, the user's eyes verge to a virtual object, but the accommodation stimulus is incorrect for near objects. The eyes may accommodate to the fixed focus distance of a display in the HMD, conflicting with the verged distance to the virtual object. More often the eyes will accommodate for a near object, which causes image blur since the virtual object distance is fixed. The decoupling of vergence and accommodation processes can cause the user to feel uncomfortable, disoriented, or nauseous. Additionally, in some artificial reality systems (e.g., in augmented reality systems), there is a location mismatch between a real-world object and an augmented reality image.

It is difficult for conventional liquid crystal lenses to meet all required design specifications on an aperture size, an optical power, a switching speed, and an image quality to mitigate the vergence-accommodation conflict and eliminate the location mismatch. For example, a large aperture size (e.g., larger than 4 cm) can be required for achieving a large field-of-view in an artificial reality system; a large optical power (e.g., ±2D) can be required for adapting human eye vergence-accommodation; a fast switching speed (e.g., approximately 300 ms) can be required for adapting human eye vergence-accommodation; and good image quality can be required for meeting human eye acuity. However, the trade-offs among the aperture size, switching speed, accommodation power and image quality is hard to resolve for the conventional liquid crystal lenses.

SUMMARY

Embodiments of the present disclosure support a head-mounted display (HMD) comprising an electronic display, an optical assembly, an eye tracker and a controller. The electronic display is configured to emit image light. The optical assembly is positioned in front of the electronic display to receive the image light emitted from the electronic display. The optical assembly is configured to correct an optical error and direct the image light to an eye box of the HMD corresponding to a location of an eye of a user wearing the HMD. The eye tracker is configured to determine a gaze vector of the user. The controller is coupled to the eye tracker and at least one element of the optical assembly having a dynamic optical axis, i.e., a dynamic optical axis component (DOAC). The controller receives information about the determined gaze vector from the eye tracker, generates emission instructions based on the information about the determined gaze vector, and provides the emission instructions to the DOAC. The DOAC is configured to move its optical axis such that the optical axis tracks the determined gaze vector, based on the emission instructions from the controller. In this way, an optical error related to the image light refracted by the DOAC and directed to a user's eye is reduced.

BRIEF DESCRIPTION OF THE DRAWINGS

FIG. 1B shows the conflict between vergence and eye focal length (accommodation) in a three-dimensional display screen.

Figure 1A:
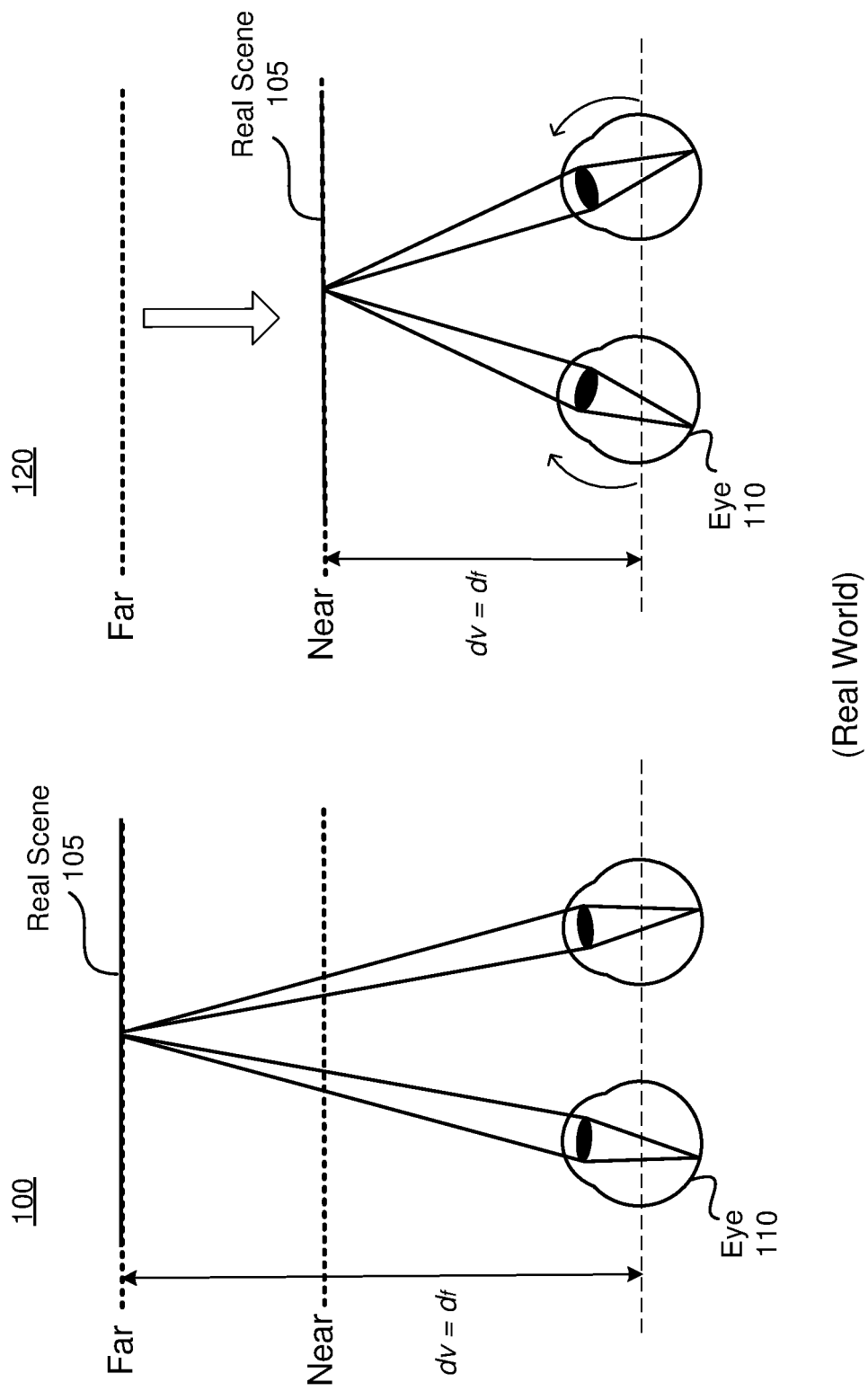
FIG. 1A shows the relationship between vergence and eye focal length (accommodation) in the real world.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system.

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

A HMD displays content to a user. The HMD may be part of an artificial reality system. A dynamic optical axis system is integrated into the HMD that includes an electronic display, an optical assembly with at least one dynamic optical axis component (DOAC), and an eye tracker. The dynamic optical axis system is able to dynamically vary location of an optical axis of the DOAC to mitigate optical errors associated with images presented to a user wearing the HMD. The dynamic optical axis system uses the eye tracker to determine a gaze vector that provides information about where the user is looking. The gaze vector represents a vector in three-dimensional (3D) space that provides sufficient information about orientation of a user's eye, and can refer herein to a direction of eye gaze. The electronic display emits image light toward the DOAC of the optical assembly. The DOAC dynamically moves its optical axis in concert with the gaze vector to mitigate an optical error related to the image light directed by the optical assembly to the user's eye.

In some embodiments, the DOAC includes at least one liquid crystal lens having a dynamic optical axis being adjustable to track a gaze vector of the user's eye within a defined threshold distance. In one or more embodiments, the optical axis can be aligned with the gaze vector such that the optical axis overlays the gaze vector. An optical axis is an axis perpendicular to a surface of an optical component (e.g., a liquid crystal lens) that passes through an optical center of the optical component, the optical center being a region where an optical error introduced to refracted light is less than in any other region of the optical component. In one or more other embodiments, the optical axis of the DOAC is considered being aligned with the gaze vector when the gaze vector passes through an optical center of the DOAC. Alternatively, the optical axis of the DOAC is considered being aligned with the gaze vector when the gaze vector passes within a threshold distance from an optical center of the DOAC. Light rays passing through an optical center of a thin optical component (or within a threshold distance from the optical center) keeps its initial ray direction, while light rays passing through other location of the thin optical component changes ray direction afterwards.

By varying an optical axis location in concert with a gaze vector, any optical error inevitably introduced by the optical assembly is mitigated. For example, in the case of a spherical lens, the optical axis runs through its physical center, and the least amount of optical error occurs near the center of the lens. Thus, by having a user looking down the optical axis, the optical error is reduced. In addition to dynamically adjusting location of an optical axis, the optical assembly directs the image light to an eye box of the HMD corresponding to a location of the user's eye. By dynamically adjusting an optical center to align with a gaze vector, a desired viewing resolution of the electronic display can be achieved. The adjustment of optical center based on the gaze vector is especially advantageous when an illumination source is a wide spectrum source, at which case a user can see color dispersion of a thin lens element if an optical center of the lens element is not aligned with a gaze vector. The larger the deviation in alignment, the larger the color dispersion the user would observe. Thus, the adjustment of optical center to align with a gaze vector within a defined threshold distance is essential for achieving a desired viewing resolution.

By dynamically changing the optical axis location in concert with the gaze vector, the aforementioned tradeoffs among an aperture size, a switching speed, an accommodation power and an image quality associated with conventional optical elements having stationary optical axis can be broken. If an optical center is aligned with a gaze vector (e.g., within a defined threshold distance), only a small section of an optical element around the optical center of a defined size should be implemented with a high quality phase profile (e.g., having phase profile with a quality metric above a threshold quality). Light rays passing through a section of the optical element outside the central section would land to a peripheral view, or even miss a user's eye completely. Thus, the phase profile outside the small central section does not affect user's visual perception. However, if location of the optical axis is not dynamically adjusted, then the entire region of optical element should have the high quality phase profile since it would not be known where the user's eye is looking through the optical element.

The dynamic optical axis system presented herein also mitigates vergence-accommodation conflict and eliminates location mismatch between a real-world object and an artificial reality object. Vergence-accommodation conflict is a problem in many virtual reality systems. Vergence is the simultaneous movement or rotation of both eyes in opposite directions to obtain or maintain single binocular vision and is linked to accommodation of the eye. Under normal conditions, when human eyes change fixation from one object to another object at a distance, the eyes automatically change focus (by changing the shape of the crystalline lens) to provide accommodation at the new distance or vergence depth of the new object. Additionally, by employing the dynamic optical axis system presented herein, an artificial reality object can be seen through a dynamic axis optical element having an optical power that changes in concert with movement of user's gaze direction (i.e., gaze vector). Due to the changing optical power, the artificial reality object appears sharp at a distance other than infinity, wherein the distance matches an angular parallax of a real-world object at the same distance, thus eliminating viewing discomfort and location mismatch between the real-world object and the artificial reality object.

FIG. 1A shows the relationship between vergence and eye focal length (accommodation) in the real world. In the example 100 of FIG. 1A, the user is looking at a real scene 105 (e.g., that includes one or more real objects) located far from the user, i.e., the scene 105 located far from the user is in focus. In the same time, user's eyes 110 are verged on the far real scene 105 and gaze lines from the user's eyes 110 intersect at the real scene 105. Thus, the vergence distance ($d_v$) equals the accommodation (focal) distance ($d_f$) in the example 100. In the example 120 of FIG. 1A, when the real scene 105 (e.g., the one or more real objects) is moved closer to the user, as indicated by the arrow in FIG. 1A, each eye 110 rotates inward (i.e., converge) to stay verged on the real scene 105. As the real scene 105 gets closer in the example 120, the eyes 110 have to "accommodate" to the closer distance by changing the shape of the crystalline lens to reduce the focal length or increase the optical power. Thus, under normal conditions in the real world, the vergence distance ($d_v$) still equals the accommodation distance ($d_f$) when looking into near objects, i.e., the vergence and accommodation are coupled in the real world.

FIG. 1B shows an example conflict between vergence and accommodation that can occur with stereoscopic three-dimensional displays, e.g., fixed-focus HMDs. In the example 130 of FIG. 1B, a user is looking at a virtual scene 135 (e.g., composed of one or more virtual objects) displayed on a 3D electronic display 140. An eyepiece 145 may be positioned in front of each eye 110. The user's eyes 110 are verged on and gaze lines from the user's eyes 110 intersect at the virtual scene 135, which is at a greater distance from the user's eyes 110 than the 3D electronic display 140. In the example 150 of FIG. 1B, the virtual scene 135 is rendered on the 3D electronic display 140 to appear closer to the user, each eye 110 again rotates inward (e.g., as shown by arrows in FIG. 1B) to stay verged on the virtual scene 135. The eyes 110 accommodate as usual when verging to the near virtual scene 135, but the accommodation stimulus is incorrect and the focus distance of the image is not sufficiently reduced. Thus, the focus is still distant and the virtual scene 135 presented on the 3D electronic display 140 appears blurry. Thus, instead of increasing the optical power to accommodate for the closer vergence depth, the eyes 110 maintain accommodation at a distance associated with the 3D electronic display 140. This discrepancy between vergence depth and focal length caused by decoupling of vergence and accommodation in stereoscopic three-dimensional displays is referred to as "vergence-accommodation conflict." A user experiencing only vergence or accommodation and not both may eventually experience some degree of fatigue and nausea, which is undesirable for virtual reality system creators. A dynamic optical axis system presented in this disclosure can mitigate vergence-accommodation conflict. The dynamic optical axis system may be part of the eyepiece 145.

Figure 2A:
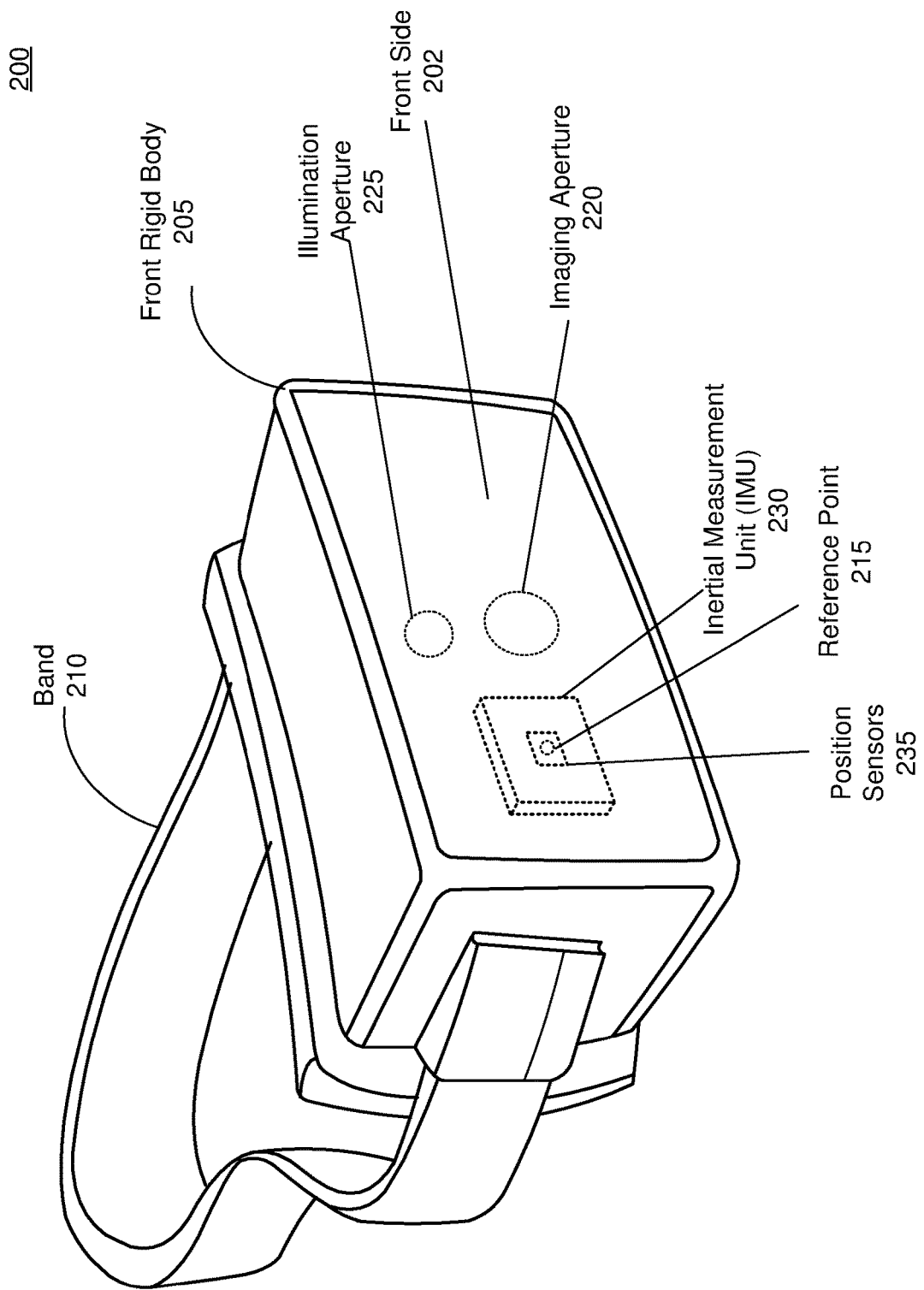
FIG. 2A is a diagram of a head-mounted display (HMD), in accordance with one or more embodiments.

FIG. 2A is a diagram of a HMD 200, in accordance with one or more embodiments. The HMD 200 may be part of an artificial reality system. In embodiments that describe an AR system and/or a MR system, portions of a front side 202 of the HMD 200 are at least partially transparent in the visible band (~380 nm to 750 nm), and portions of the HMD 200 that are between the front side 202 of the HMD 200 and an eye of the user are at least partially transparent (e.g., a partially transparent electronic display). The HMD 200 includes a front rigid body 205, a band 210, and a reference point 215. The HMD 200 may also include a depth camera assembly (DCA) configured to determine depth information of a local area surrounding some or all of the HMD 200. The HMD 200 may also include an imaging aperture 220 and an illumination aperture 225, and an illumination source of the DCA emits light (e.g., a structured light pattern) through the illumination aperture 225. An imaging device of the DCA captures light from the illumination source that is reflected from the local area through the imaging aperture 220.

The front rigid body 205 includes one or more electronic display elements (not shown in FIG. 2A), one or more integrated eye tracking systems (not shown in FIG. 2A), an Inertial Measurement Unit (IMU) 230, one or more position sensors 235, and the reference point 215. In the embodiment shown by FIG. 2A, the position sensors 235 are located within the IMU 230, and neither the IMU 230 nor the position sensors 235 are visible to a user of the HMD 200. The IMU 230 is an electronic device that generates IMU data based on measurement signals received from one or more of the position sensors 235. A position sensor 235 generates one or more measurement signals in response to motion of the HMD 200. Examples of position sensors 235 include: one or more accelerometers, one or more gyroscopes, one or more magnetometers, another suitable type of sensor that detects motion, a type of sensor used for error correction of the IMU 230, or some combination thereof. The position sensors 235 may be located external to the IMU 230, internal to the IMU 230, or some combination thereof.

Figure 2B:
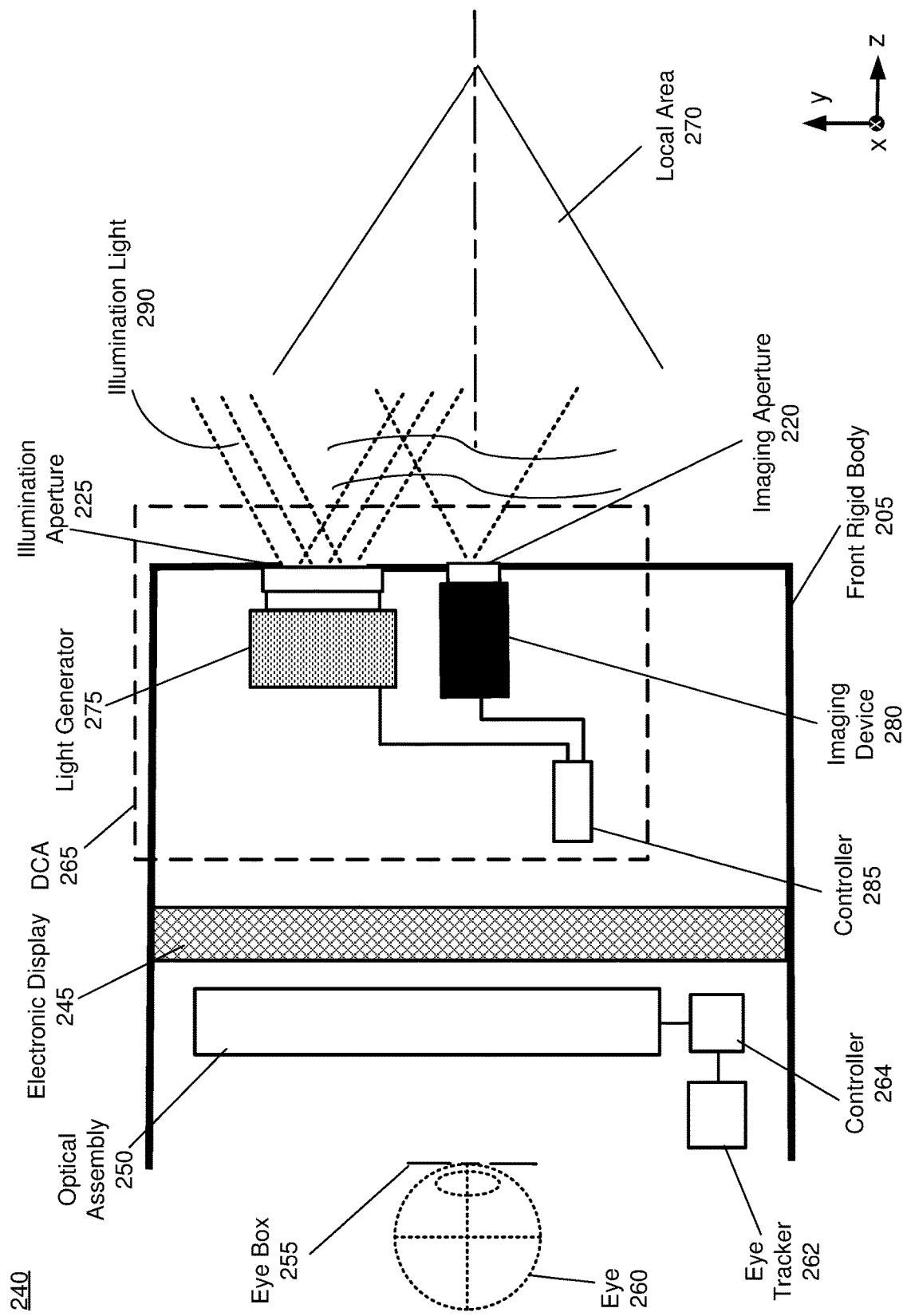
FIG. 2B is a cross section of a front rigid body of the HMD in FIG. 2A, in accordance with one or more embodiments.

FIG. 2B is a cross section 240 of the front rigid body 205 of the HMD 200 shown in FIG. 2A, in accordance with one or more embodiments. As shown in FIG. 2B, the front rigid body 205 includes an electronic display 245, and an optical assembly 250 that together provide image light to an eye box 255. The eye box 255 is a region in space that is occupied by a user's eye 260. The front rigid body 205 further includes an eye tracker 262 for tracking position of the eye 260 (i.e., eye gaze) in the eye box 255, and a controller 264 coupled to the eye tracker 262 and the optical assembly 250. For purposes of illustration, FIG. 2B shows a cross section 240 associated with a single eye 260, but another optical assembly 250, separate from the optical assembly 250, provides altered image light to another eye of the user. Also, another eye tracker 262, separate from the eye tracker 262 may be integrated into the front rigid body 205 to track position of the other eye of the user.

The electronic display 245 generates image light. The electronic display 245 may be configured to display images to the user in accordance with data received from a console (not shown in FIG. 2B) or some other module of the HMD 200. In various embodiments, the electronic display 245 may comprise a single electronic display or multiple electronic displays (e.g., a display for each eye of a user). Examples of the electronic display 245 include: a liquid crystal display (LCD), an organic light emitting diode (OLED) display, an inorganic light emitting diode (ILED) display, an active-matrix organic light-emitting diode (AMOLED) display, a transparent organic light emitting diode (TOLED) display, some other display, a projector, or some combination thereof. The electronic display 245 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light emitted from the electronic display 245. In some embodiments, one or more optical elements integrated into the electronic display 245 may have one or more coatings, such as anti-reflective coatings.

The optical assembly 250 receives the image light emitted from the electronic display 245. The optical assembly 250 dynamically mitigates an optical error and directs the image light to the eye box 255 of the eye 260. In some embodiments, the optical assembly 250 includes at least one DOAC (e.g., at least one liquid crystal lens) having an optical axis that dynamically moves in accordance with location of a pupil of the eye 260 (i.e., gaze location) determined by the eye tracker 262 to mitigate the optical error. The DOAC within the optical assembly 250 (not shown in FIG. 2B) basically functions as a Fresnel lens that may be translated along x and/or y dimensions, such that an optical center of the Fresnel lens is always in a foveal region of the user's eye 260 regardless of a gaze vector. The dynamically adjustable optical axis of the optical assembly 250 passes substantially through a center of the user's pupil, and passes substantially through a fovea of the eye 260 (e.g., within a threshold distance). Thus, an optical center of the optical assembly 250 tracks a foveal region of the user's eye 260. In this way, optical errors associated with image light refracted by the optical assembly 250 and reaching the eye box 255 are minimized. In some embodiments, the optical assembly 250 only includes the at least one DOAC. In some other embodiments, the optical assembly 250 includes one or more other optical elements in addition to the at least one DOAC.

In one or more embodiments, the optical assembly 250 is further configured to adjust focus of the image light, based in part on emission instructions from the controller 264. The optical assembly 250 may include a varifocal element (not shown in FIG. 2B) configured to adjust a focal distance of the optical assembly 250 in relation to the image light, e.g., based on information about a gaze vector of the user's eye 260. For example, the adjustment of focal distance can be achieved by adjusting an optical power of the varifocal element, or by the varifocal element moving the electronic display 245 relative to one or more components of the optical assembly 250.

The optical assembly 250 may magnify image light received from the electronic display 245, correct optical aberrations associated with the image light, and present the corrected image light to a user of the HMD 200. At least one optical element of the optical assembly 250 (in addition to the at least one DOAC) may be an aperture, a Fresnel lens, a refractive lens, a reflective surface, a diffractive element, a waveguide, a filter, or any other suitable optical element that affects the image light emitted from the electronic display 245. Moreover, the optical assembly 250 may include combinations of different optical elements. In some embodiments, one or more of the optical elements in the optical assembly 250 may have one or more coatings, such as anti-reflective coatings, dichroic coatings, etc. Magnification of the image light by the optical assembly 250 allows elements of the electronic display 245 to be physically smaller, weigh less, and consume less power than larger displays. Additionally, magnification may increase a field-of-view of the displayed media. For example, the field-of-view of the displayed media is such that the displayed media is presented using almost all (e.g., 110 degrees diagonal), and in some cases all, of the field-of-view. In some embodiments, the optical assembly 250 is designed so its effective focal length is larger than the spacing to the electronic display 245, which magnifies the image light projected by the electronic display 245. Additionally, in some embodiments, the amount of magnification may be adjusted by adding or removing optical elements. More details about structure and operation of the optical assembly 250 with at least one DOAC are described in conjunction with FIGS. 3A-3E.

The eye tracker 262 determines eye tracking information for the user's eye 260. The eye tracking information may comprise information about a position and an orientation of the user's eye 260 in the eye-box 255, i.e., information about location of a pupil of the eye 260 and information about a gaze vector of the user's eye 260. The eye tracker 262 may include a light source (not shown in FIG. 2B) emitting light toward the eye box 255 and an imaging device or camera (not shown in FIG. 2B) that captures light reflected from one or more surfaces of the user's eye 260. In one embodiment, the user's eye 260 is illuminated with structured light. In this case, the eye tracker 262 may determine a position of the user's eye 260 and a gaze vector of the user's eye 260 based on distortions in a captured image of a pattern of the structured light reflected from at least one surface of the user's eye 260. In another embodiment, the eye tracker 262 determines eye position and a gaze vector of the user's eye 260 based on magnitudes of light reflected from at least one surface of the user's eye 260 that are captured over a defined period of time. More details about structure and operation of the eye tracker 262 are disclosed in conjunction with FIG. 3A.

In some embodiments, the front rigid body 205 further includes a DCA 265 for determining depth information of one or more objects in a local area 270 surrounding some or all of the HMD 200. The DCA 265 includes a light generator 275, an imaging device 280, and a controller 285 that may be coupled to both the light generator 275 and the imaging device 280. The light generator 275 emits light through the illumination aperture 225. The light generator 275 illuminates the local area 270 with illumination light 290, e.g., in accordance with emission instructions generated by the controller 285. The controller 285 is configured to control, based on the emission instructions, operation of certain components of the light generator 275, e.g., to adjust an intensity and a pattern of the illumination light 290 illuminating the local area 270. In some embodiments, the illumination light may include a structured light pattern, e.g., dot pattern, line pattern, etc.

The light generator 275 may include a plurality of emitters that each emits light having certain characteristics (e.g., wavelength, polarization, coherence, temporal behavior, etc.). The characteristics may be the same or different between emitters, and the emitters can be operated simultaneously or individually. In one embodiment, the plurality of emitters could be, e.g., laser diodes (e.g., edge emitters), inorganic or organic LEDs, a vertical-cavity surface-emitting laser (VCSEL), or some other source. In some embodiments, a single emitter or a plurality of emitters in the light generator 275 can emit one or more light beams.

The imaging device 280 includes one or more cameras configured to capture, through the imaging aperture 220, at least a portion of the illumination light 290 reflected from the local area 270. The imaging device 280 captures one or more images of one or more objects in the local area 270 illuminated with the illumination light 290. The controller 285 coupled to the imaging device 280 is also configured to determine depth information for the one or more objects based on the captured portion of the reflected illumination light. In some embodiments, the controller 285 provides the determined depth information to a console (not shown in FIG. 2B) and/or an appropriate module of the HMD 200 (e.g., the controller 264). The console and/or the HMD 200 may utilize the depth information to, e.g., generate content for presentation on the display assembly 245.

The controller 264 may be configured to receive eye tracking information from the eye tracker 262, i.e., information about a gaze vector of the user's eye 260 which corresponds to location of the pupil of the user's eye 260. The controller 264 instructs at least one DOAC of the optical assembly 250 to change a location of its optical axis based on the eye tracking information, thus mitigating an optical error of the optical assembly 250. The controller 264 may be also configured to instruct any varifocal element of the optical assembly 250 to adjust focus of displayed images based on the received eye tracking information, e.g., based on information about the gaze vector of the eye 260. In some embodiments, the controller 264 utilizes the depth information from the controller 285 to generate content for presentation on the electronic display 245. More details about operation of the controller 264 in relation to the optical assembly 250 and the eye tracker 262 are disclosed in conjunction with FIG. 3A and FIG. 4.

Figure 3A:
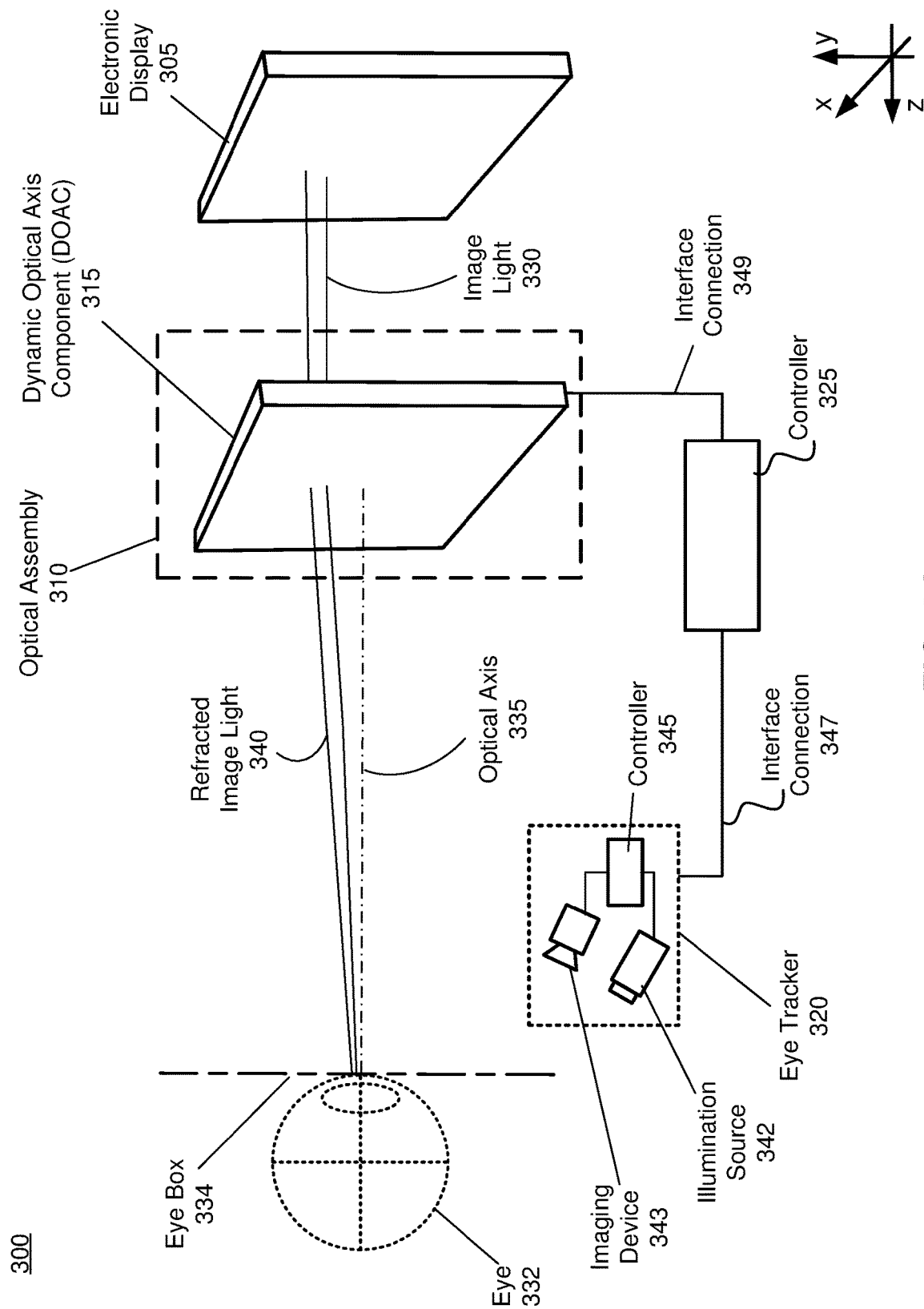
FIG. 3A illustrates an example dynamic optical axis system that includes an electronic display, an optical assembly, an eye tracker and a controller, which may be part of the HMD in FIG. 2A, in accordance with one or more embodiments.

FIG. 3A illustrates an example dynamic optical axis system 300, which may be part of the HMD in FIG. 2A, in accordance with one or more embodiments. The dynamic optical axis system 300 includes an electronic display 305, an optical assembly 310 with at least one DOAC 315, an eye tracker 320, and a controller 325 coupled to the at least one DOAC 315 and the eye tracker 320.

The electronic display 305 emits image light 330 toward the optical assembly 310 and the at least one DOAC 315. A resolution of the emitted image light 330 may be fixed and based on a pixel resolution of the electronic display 305. The electronic display 305 may be implemented as a LCD, an OLED display, an ILED display, an AMOLED display, a TOLED display, some other display, a projector, or some combination thereof. In some embodiments, the electronic display 305 may also include an aperture, a Fresnel lens, a convex lens, a concave lens, a diffractive element, a waveguide, a filter, a polarizer, a diffuser, a fiber taper, a reflective surface, a polarizing reflective surface, or any other suitable optical element that affects the image light 330 emitted from the electronic display 305. The electronic display 305 may be an embodiment of the electronic display 245 in FIG. 2B.

The DOAC 315 of the optical assembly 310 is positioned in front of the electronic display 305. The DOAC 315 refracts the image light 330 received from the electronic display 305. The DOAC 315 is an optical element having an optical axis 335 whose location is dynamically adjustable. The DOAC 315 may be implemented as, e.g., at least one liquid crystal lens having a dynamic optical axis. In accordance with embodiments of the present disclosure, the DOAC 315 can dynamically vary location of its optical axis 335 based on a gaze vector of a user's eye 332 determined by the eye tracker 325. The optical axis 335 of the DOAC 315 is dynamically moved to track the determined gaze vector of the user's eye 332, e.g., within a threshold distance. By dynamically moving the optical axis 335 in concert with the gaze vector, an optical error introduced by the optical assembly 310 to refracted image light 340 is mitigated. In this way, the dynamic optical axis system 300 reduces user's visual discomfort, e.g., due to vergance-accommodation conflict and location mismatch between a real-world object and an augmented reality image.

Note that when the optical axis 335 is moved to track a gaze vector of the eye 332, the optical axis 335 may be actually translated along x and/or y dimensions while being perpendicular to a surface of the DOAC 315. In this case, the optical axis 335 is not aligned with the gaze vector, but the optical axis 335 is located within a threshold distance from the gaze vector. The gaze vector may still pass through an optical center of the DOAC 315, i.e., an optical center region of the DOAC 315 around the optical center tracks the movement of gaze vector. Rays of the refracted image light 340 passing through an optical center of the eye 332 (e.g., foveal region) also pass through the optical center of the DOAC 315 (or the optical center region of the DOAC 315), while not being necessarily perpendicular to an optical surface of the DOAC 315. In one or more embodiments, the optical axis 335 tilts around z dimension, i.e., the DOAC 315 can be configured to move the optical axis 335 in 3D space. In this case, the tilted optical axis 335 can align (overlay) the gaze vector of the eye 332.

The DOAC 315 includes at least one liquid crystal lens having a movable optical axis 335. The optical axis 335 of the at least one liquid crystal lens is dynamically adjusted to track the determined gaze vector of the user's eye 332. In some embodiments, the DOAC 315 is implemented as a liquid crystal lens having a grid of horizontal and vertical lines forming a pattern of electrodes. An electrical power (e.g., an appropriate voltage level or electrical field) applied to each individual electrode in the pattern can be individually controlled (e.g., by the controller 325). By controlling a level of electrical field in each electrode of the DOAC 315, a shape of the liquid crystal lens of the DOAC 315 can change and the optical axis 335 can be adjusted to track the determined gaze vector of the eye 332. In this manner, a liquid crystal lens may form, e.g., a Fresnel lens. The optical axis 335 passes through a center of the Fresnel lens. As the gaze vector changes, the location of optical axis 335 is adjusted such that the center of the Fresnel lens is always in a foveal region of the user regardless of gaze orientation. In some embodiments, the liquid crystal lens also tilts the optical axis 335 such that the optical axis 335 overlays the user's gaze vector. In some embodiments, the gaze vector passes through an optical center of the liquid crystal lens. In some other embodiments, the gaze vector is within a threshold distance from the optical center. More details about structure of the liquid crystal lens of the DOAC 315 having a grid of horizontal and vertical lines are described in conjunction with FIG. 3D.

In one or more other embodiments, the DOAC 315 is implemented as a liquid crystal lens having a plurality of concentric ring sections. The liquid crystal lens having the plurality of concentric ring sections functions as a Fresnel lens that can translate along x and/or y dimensions. A ring section represents an individually controlled electrode that may form, e.g., a Fresnel ring. Location of a center of concentric ring sections (and hence an optical center of the liquid crystal lens) may be dynamically changed to track the determined gaze vector, e.g., based on emission instructions from the controller 325. In some embodiments, the center of concentric ring sections is aligned with the gaze vector, i.e., the gaze vector passes through the center of concentric ring sections. In some other embodiments, the gaze vector is within a threshold distance to the center of concentric ring sections. By aligning the center of concentric ring sections with the determined gaze vector, an optical error introduced by the liquid crystal lens to the refracted image light 335 reaching the eye box 334 is reduced. The image light 330 emitted from the electronic display 305 and refracted by the DOAC 315 composed of the liquid crystal lens with the concentric ring sections may comprise unpolarized light. In one embodiment, shifting the location of concentric ring centers of the DOAC 315 can cause continuous phase changes that are warped in mod (2pi) for supporting specific wavelengths of the unpolarized image light 330. More details about structure of the liquid crystal lens of the DOAC 315 having a plurality of concentric ring sections are described in conjunction with FIG. 3E.

In one or more other embodiments, the optical assembly 310 includes a non-Fresnel type lens having a tunable thickness. A thickness of the non-Fresnel type lens and hence a focal distance of the optical assembly 310 can be adjusted, e.g., based in part on the determined gaze vector of the user's eye 332. In one or more other embodiments, the optical assembly 310 includes a multi-focal liquid crystal lens. A focal distance of the multi-focal crystal lens may vary based in part on the determined gaze vector of the user's eye 332. In yet another embodiment, the optical assembly 310 includes a liquid crystal lens based on geometric phase having an effective focal distance that can be adjusted, e.g., based in part on the determined gaze vector of the user's eye 332.

The optical assembly 310 is further configured to direct the image light 340 refracted by the DOAC 315 to the eye box 334 corresponding to a location of the user's eye 332. The optical assembly 310 may include one or more optical elements, such as an aperture, a Fresnel lens, a refractive lens, a reflective surface, a diffractive element, a waveguide, a filter, or any other suitable optical element that affects incident light. Moreover, the optical assembly 310 may include combinations of different optical elements. The optical assembly 310 may be an embodiment of the optical assembly 250 in FIG. 2B.

The eye tracker 320 is configured to track a gaze vector of the user's eye 332, i.e., to track location of a pupil of the user's eye 332. The eye tracker 320 tracks the gaze vector by determining a position and orientation of the user's eye 332 in the eye box 334 over a defined period of time. The eye tracker 320 may include an illumination source 342, an imaging device (camera) 343, and a controller 345 coupled to the illumination source 342 and the imaging device 343. The controller 345 may be configured to determine a position and orientation of at least a single eye 332. In alternate embodiments, multiple illumination sources or multiple imaging devices may be employed for a single eye 332. Similarly, for each of the user's eye 332, a corresponding illumination source and imaging device may be employed. The components of the eye tracker 320 may be hidden from the user's sight as the illumination source 342, the imaging device 343 and the controller 345 are positioned outside a primary display optical path to the user's eye 332.

The illumination source 342 emits light toward the eye box 334 of the user's eye 332. In one embodiment, the illumination source 342 comprises a plurality of emitters that emit infrared (IR) light. The plurality of emitters of the illumination source 342 may be implemented on a single substrate. In an alternative embodiment, the illumination source 342 may comprise a single emitter of IR light. In yet another embodiment, the illumination source 342 is configured to emit structured light. The controller 345 coupled to the illumination source 342 may control operations of one or more light emitters in the illumination source 342. In one embodiment, the controller 345 modulates light emitted from the illumination source 342. In another embodiment, the controller 345 controls one or more wavelengths of light emitted from the illumination source 342. In one or more embodiments, the light emitted from the illumination source 342 comprises light having at least one of a wavelength of 850 nm or a wavelength of 940 nm, which is not visible to the user's eye 332. In general, the light emitted from the illumination source 342 comprises light having one or more wavelengths larger than 750 nm.

The imaging device 343 may be configured to capture an image of the eye 332 illuminated with light emitted from the illumination source 342. The imaging device 343 may be configured to capture light reflected from a surface of the eye 332. In one or more embodiments, the imaging device 343 comprises a camera configured to capture images in the IR. In some embodiments, the imaging device 343 is configured to capture a wide field-of-view of the user's eye 332. For example, the field-of-view of the full eye box 334 of the eye 332 and even significantly more can be covered by appropriate positioning of the illumination source 342 and the imaging device 343.

The controller 345 coupled to the illumination source 342 and the imaging device 343 is configured to determine eye tracking information for the user's eye 332, based on light reflected from at least one surface of the user's eye 332 and captured by the imaging device 343. In one or more embodiments, the eye tracking information determined by the controller 345 may comprise information about a position and orientation of the eye 332, i.e., information about a vector of eye gaze and eye gaze location. In one embodiment, the user's eye 332 is illuminated with structured light emitted from the illumination source 342. In this case, the controller 345 may use distortions in an image of the structured light reflected from at least one surface of the user's eye 332 and captured by the imaging device 343 to determine a position of the user's eye 332 and eye gaze. In another embodiment, the controller 345 determines eye position and eye gaze based on magnitudes of light reflected from at least one surface of the user's eye 332 that are captured by the imaging device 343 over a time period. In some other embodiments, other types of the eye tracker 320 can be used, e.g., stereo, time-of-flight, or any other system which can determine gaze orientation.

The eye tracker 320 may be coupled to the controller 325, e.g., via an interface connection 347 implemented between the controller 345 of the eye tracker 320 and the controller 325. The eye tracker 320 may provide, via the interface connection 347, information about the tracked gaze vector of the user's eye 332 to the controller 325, e.g., at a rate that supports fast changes of user's gaze vector. The eye tracker 320 may be fast enough such that eye motions of a defined speed range are detected and reported, e.g., to the controller 325. In some embodiments (not shown in FIG. 3), the controller 345 is not part of the eye tracker 320, but instead the controller 325 is directly interfaced with the imaging device 343. Then, the controller 325 may be configured to determine the eye tracking information for the user's eye 332 and track gaze vector of the user's eye 332 over time, based on light reflected from at least one surface of the user's eye 332 and captured by the imaging device 343. In one or more embodiments, the controller 345 is part of the controller 325.

The controller 325 may be coupled to the DOAC 315, e.g., via an interface connection 349. The controller 325 may be an embodiment of the controller 264 in FIG. 2B. As discussed, the controller 325 may receive (e.g., from the controller 345 of the eye tracker 320), at a specific rate, information about the tracked gaze vector (i.e., tracked pupil location) of the user's eye 332. Alternatively, the controller 325 may be configured to directly determine information about the tracked gaze vector of the user's eye 332, based on one or more images of the user's eye 332 captured by the imaging device 343. The controller 325 may generate emission instructions based on the information about the tracked gaze vector. Then, the controller 325 may provide (e.g., via the interface connection 349) the emission instructions to the DOAC 310 to dynamically adjust location of the optical axis 335 based on the tracked gaze vector of the eye 332. In this way, an optical error associated with the refracted image light 340 reaching the eye box 334 of the eye 332 is reduced.

In some embodiments, as discussed, the DOAC 315 is implemented as a liquid crystal lens having a grid of horizontal and vertical lines forming a pattern of electrodes. The controller 325 may be configured to control a voltage level (i.e., an electrical field) applied to each individual electrode in the pattern, based in part on the emission instructions. By controlling a level of electrical field in each electrode, a shape of the liquid crystal lens can change and position of the optical axis 335 can be adjusted to track (e.g., within a threshold distance) the determined gaze vector of the eye 332.

In some other embodiments, as discussed, the DOAC 315 is implemented as a liquid crystal lens having a plurality of ring sections. The controller 325 may be configured to control one or more voltage levels applied to the DOAC 315 to dynamically adjust location of a ring center of each ring section to align the optical axis 335 with the determined gaze vector, based in part on the emission instructions. Note that the alignment may be satisfied if the gaze vector is within a threshold distance from a nearest available location of the optical axis 335. In one or more other embodiments, as discussed, the optical assembly 310 includes a non-Fresnel type lens having a tunable thickness. The controller 325 may be configured to control one or more voltage levels applied to the non-Fresnel type lens of the optical assembly 310 to adjust a thickness of the non-Fresnel type lens and to dynamically adjust a focal distance of the optical assembly 310, based in part on the emission instructions.

In some embodiments, the controller 325 may be also configured to determine mapping between voltage levels applied to at least one liquid crystal lens of the DOAC 315 for dynamically adjusting position of the optical axis 335 and different gaze vectors of the user's eye 332. Information about the mapping may be stored in, e.g., a memory coupled to the controller 325 (not shown in FIG. 3A). The controller 325 may then provide the emission instructions (e.g., corresponding voltage levels) to the at least one liquid crystal lens of the DOAC 315 to adjust the optical axis 335 to ensure that an optical error associated with the refracted image light 340 reaching the eye box 334 is reduced, based on the information about mapping.

Note that mapping between the applied voltage levels and gaze vectors of the user's eye 332 can be different for different users. The controller 325 may be configured to perform per user mapping between the plurality of voltage levels and the gaze vectors. The per user mapping may be performed by first providing certain content for presentation (e.g., circular objects or objects of some other suitable shape) on predetermined regions of the electronic display 305. The eye tracker 320 then tracks and determines different gaze vectors of the user's eye 332 when the user is looking at the content presented on the predetermined regions of the electronic display 305 through the at least one liquid crystal lens of the DOAC 315. The controller 325 coupled with both the eye tracker 320 and the DOAC 315 may then determine mapping between a voltage level and a gaze vector of the user's eye 332 for a specific user.

Figure 3B:
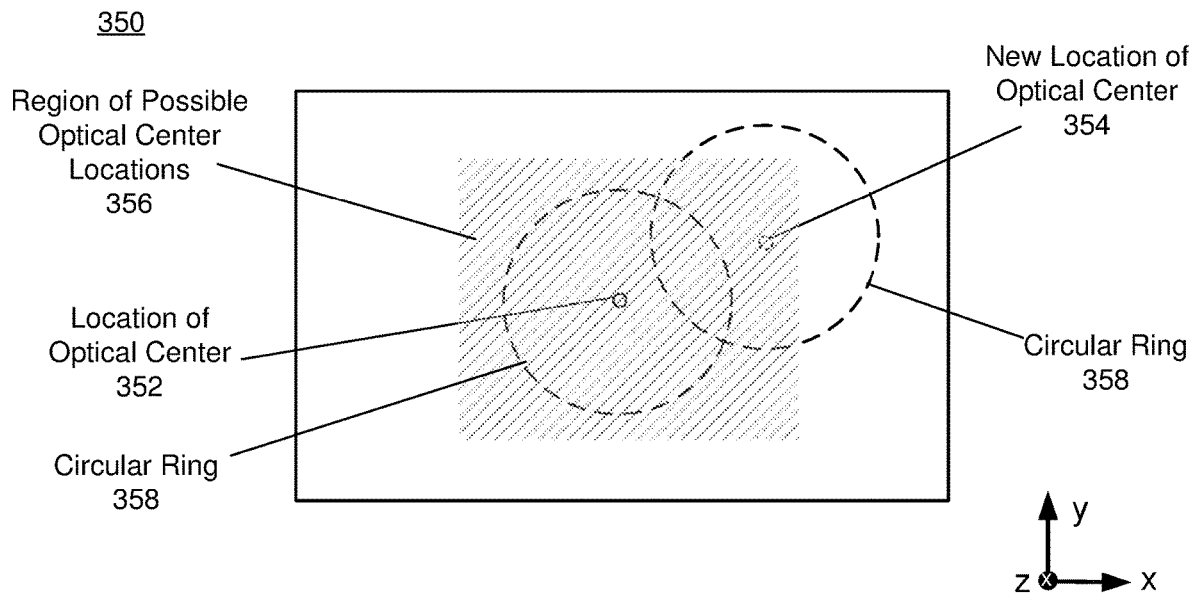
FIG. 3B illustrates an example dynamic optical axis component (DOAC) of the optical assembly in FIG. 3A with fine resolution of optical axis location, in accordance with one or more embodiments.

FIG. 3B illustrates an example DOAC 350 of the optical assembly 310 in FIG. 3A with fine resolution of optical axis location, in accordance with one or more embodiments. The DOAC 350 may be an embodiment of the DOAC 315 in FIG. 3A. The DOAC 350 may be configured to have a dynamic optical axis that continuously follow user's eye position (i.e., a gaze vector of the user's eye) consistently with a defined resolution (e.g., approximately 1° resolution of angle between two adjacent locations of optical axis). In this way, the refracted image light 340 can reach the eye box 334 from a right angle at a right time instant to provide a sharp image and provide focus cues dynamically based on presented content and human eye gaze point.

Location of an optical center of the DOAC 350 (and correspondingly location of its optical axis) can be adjusted with a certain resolution. For example, as shown in FIG. 3A, a location of optical center (and optical axis location) can move from location 352 to location 354 to track a gaze vector of a user's eye. The movement from location 352 to location 354 can occur during a single time instant or during multiple time instants, depending on movement of the user's eye. A region 356 of the DOAC 350 represents a region within which the optical center (i.e., optical axis) of the DOAC 350 can move with a defined resolution. A circular ring 358 represents an individually controlled electrode that may form, e.g., a Fresnel ring. Movement of the circular ring 358 (and movement of an optical center) may be controlled by applying specific voltage levels, e.g., based on instructions from the controller 325.

Figure 3C:
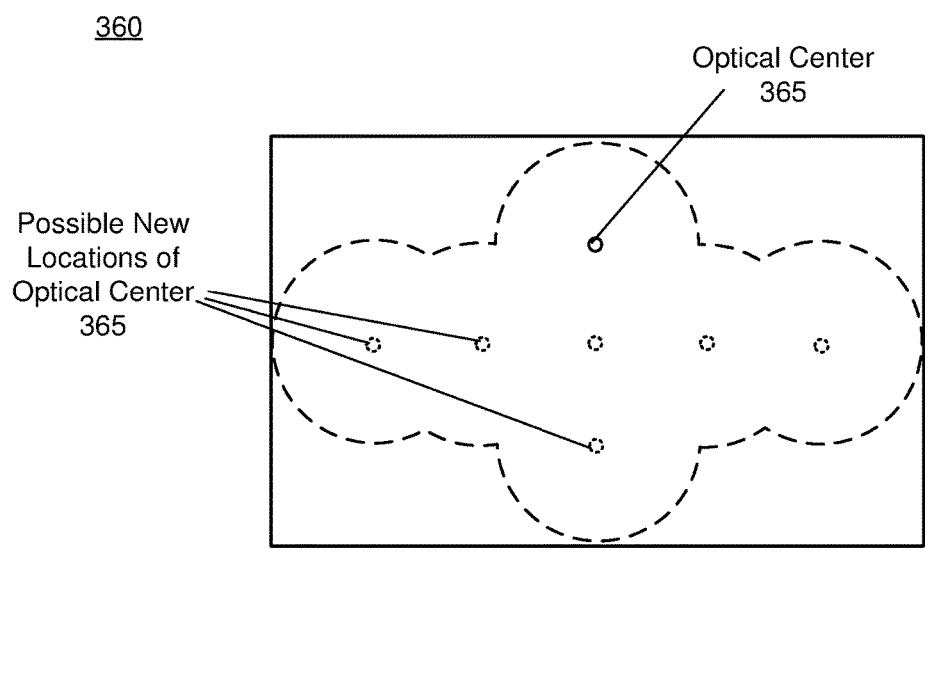
FIG. 3C illustrates an example DOAC of the optical assembly in FIG. 3A with coarse resolution of optical axis location, in accordance with one or more embodiments.

FIG. 3C illustrates an example DOAC 360 of the optical assembly 310 in FIG. 3A with coarse resolution of optical axis location, in accordance with one or more embodiments. Instead of using liquid crystal lenses with real-time dynamic optical axis synchronized with an eye tracker, with approximately 1° or even better resolution of gaze vector tracking, liquid crystal lenses with semi-dynamic optical axis can be used. In the configuration shown in FIG. 3C, the DOAC 360 is implemented as a collection of liquid crystal lens electrodes having coarse resolution for optical axis location. At one time only one optical center associated with one electrode is in active state, and there should be no two lenses actuated at the same period of time. Information about possible locations of an optical center 365 of the DOAC 36 may be pre-loaded, e.g., in a memory coupled to the DOAC 360 (not shown in FIG. 3C). The total of different pre-loaded locations of the optical center 365 can be 3, 5, 7 or more, depending on, e.g., an aperture size of an active zone size and/or a size of the entire clear aperture of an HMD glass. In this way, presented content can have sufficiently sharp image resolution, while a switching speed of the DOAC 360 can be faster than that of the DOAC 350 in FIG. 3A having fine resolution for an optical axis center. Movement of the optical center 365 may be controlled by applying specific voltage levels, e.g., based on instructions from the controller 325.

Figure 3D:
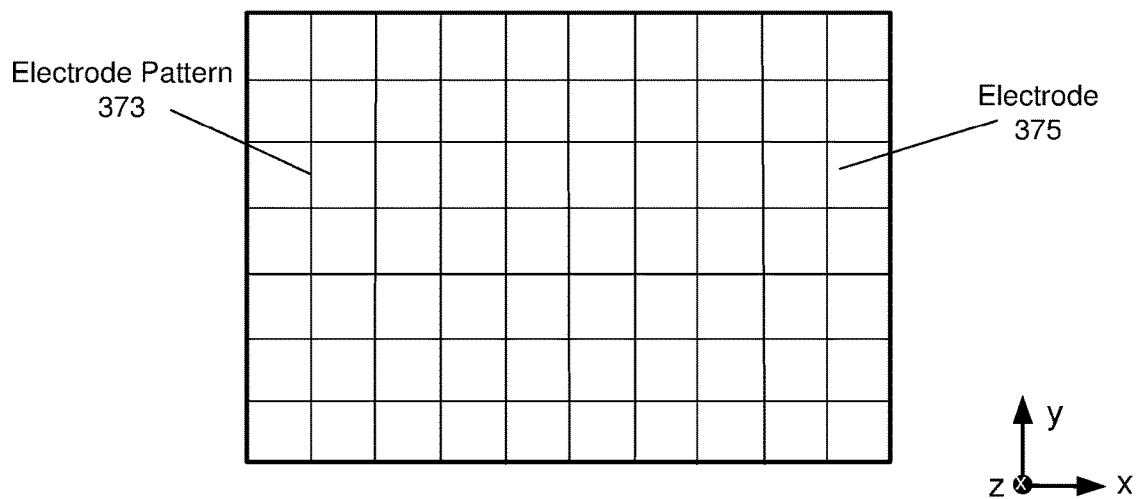
FIG. 3D illustrates an example DOAC of the optical assembly in FIG. 3A implemented as a Fresnel lens having an electrode pattern, in accordance with one or more embodiments.

FIG. 3D illustrates an example DOAC 370 implemented as a Fresnel lens having an electrode pattern, in accordance with one or more embodiments. The DOAC 370 may be an embodiment of the DOAC 315 of the optical assembly 310 in FIG. 3A. The DOAC 370 can be implemented as a Fresnel lens having a grid of horizontal and vertical lines, forming an electrode pattern 373. One piece of the DOAC 370 may be horizontally oriented providing horizontal lines and other piece of the DOAC 370 may be vertically oriented providing vertical lines. In some embodiments, the horizontally oriented piece of the DOAC 370 and the vertically oriented piece of the DOAC 370 are implemented in different substrates. Each electrode 375 in the electrode pattern 373 may be individually controlled (e.g., by the controller 325) by applying a specific electric power (voltage) to that electrode 375. By individually controlling an electrical power in each electrode 375, a phase profile of the DOAC 370 can change and location of an optical axis of the DOAC 370 can be adjusted to track a gaze vector of a user's eye. The phase activation of electrodes 375 may occur at the same time, i.e., the configuration of DOAC 370 based on the electrode pattern may require active matrix drive for individual activation of specific electrodes 375 during a specific time period.

Note that the resolution of the electrode pattern 373 (e.g., size of the electrode 375) may vary providing different resolutions for position of an optical center of the DOAC 370. In one embodiment, resolution of the electrode pattern 373 is above a threshold resolution. In this case, the DOAC 370 features fine resolution for optical axis location, and the DOAC 370 can be an embodiment of the DOAC 350 in FIG. 3B. In another embodiment, resolution of the electrode pattern 373 is below a threshold resolution. In this case, the DOAC 370 features coarse resolution for optical axis location, and the DOAC 370 can be an embodiment of the semi-dynamic optical axis component 360 in FIG. 3B.

Figure 3E:
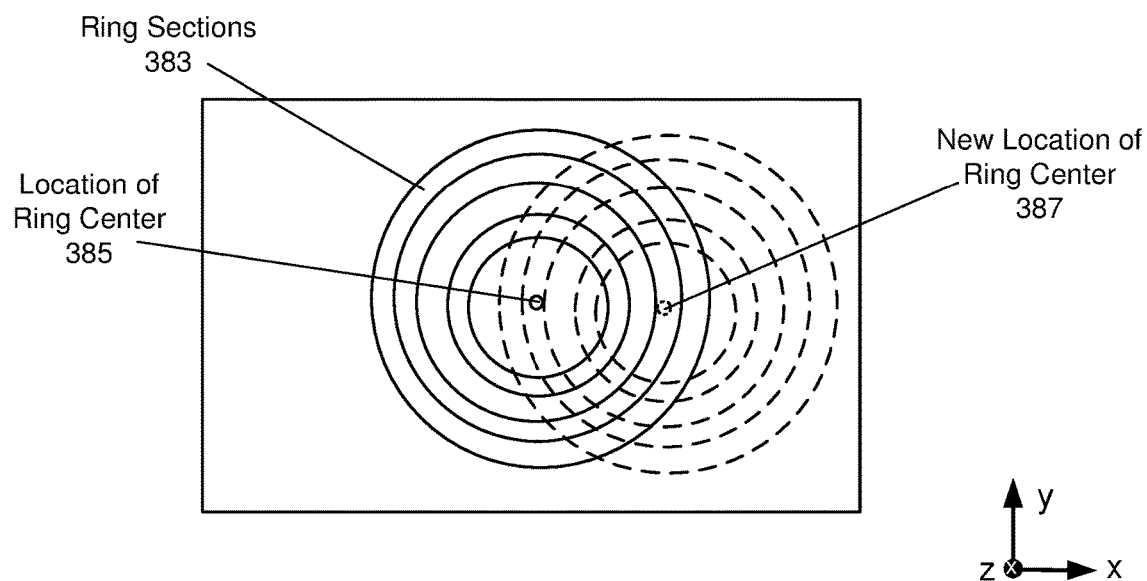
FIG. 3E illustrates an example DOAC of the optical assembly in FIG. 3A implemented as a liquid crystal lens having a plurality of concentric ring sections (electrodes), in accordance with one or more embodiments.

FIG. 3E illustrates an example DOAC 380 of the optical assembly in FIG. 3A implemented as a liquid crystal lens having a plurality of concentric ring sections 383 (electrodes), in accordance with one or more embodiments. One of the ring sections 383 represents an individually controlled electrode that may form, e.g., a Fresnel ring. Position of a ring center 385 of concentric ring sections 383 (and hence an optical center of the DOAC 380) may be dynamically adjusted such that a gaze vector associated with a user's eye is aligned with the ring center 385. The alignment may be satisfied if the gaze vector is within a threshold distance from a nearest available location of a ring center. The adjustment of ring center position may be achieved the based on one or more voltage levels applied to one or more ring sections 383, e.g., based on instructions from the controller 325. For example, as shown in FIG. 3E, a location of optical center (and optical axis location) can move from location 385 to location 387 to track the gaze vector of user's eye. The movement from location 385 to location 387 can occur during a single time instant or during multiple time instants. Note that a phase of the DOAC 380 when light passes through the DOAC 380 (e.g., within a threshold distance from the ring center 385) can change in 2pi steps, and the phase change can be considered to be in, e.g., z direction. The optical center location of the DOAC 380 is changed in x-y plane, e.g., with resolution of approximately 1 mm along x direction and/or y direction.

Note that the resolution of ring sections 383 may vary, which provides different resolutions for location of an optical center (and, hence, for optical axis location) of the DOAC 380. In one embodiment, the resolution of the ring sections 383 is above a threshold resolution. In this case, the DOAC 380 features fine resolution for its optical axis, and the DOAC 380 can be an embodiment of the DOAC 350 in FIG. 3B. In another embodiment, the resolution of the ring sections 383 is below a threshold resolution. In this case, the DOAC 380 features coarse resolution for its optical axis, and the DOAC 380 can be an embodiment of the semi-dynamic optical axis component 360 in FIG. 3C. Note also that the resolution of ring sections 383 is related to sizes of individual electrodes, and the resolution of ring sections 383 mainly affects a pixel sample in x-y dimensions. A larger pixel sample would cause inaccuracy in phase representation, especially at outer ring sections 383. On the other hand, the effect of resolution on the optical center can be ignored. However, at the outer ring sections 383, the resolution of pixel sample is higher (e.g., a size of pixel sample is below a threshold value) so that the phase of DOAC 380 can be accurately presented by a pixel size. For example, the resolution of pixel sample at the outer ring sections 383 may be in the order of microns or tens of microns, depending on a required optical power and a size of the outer ring section 383.

Figure 4:
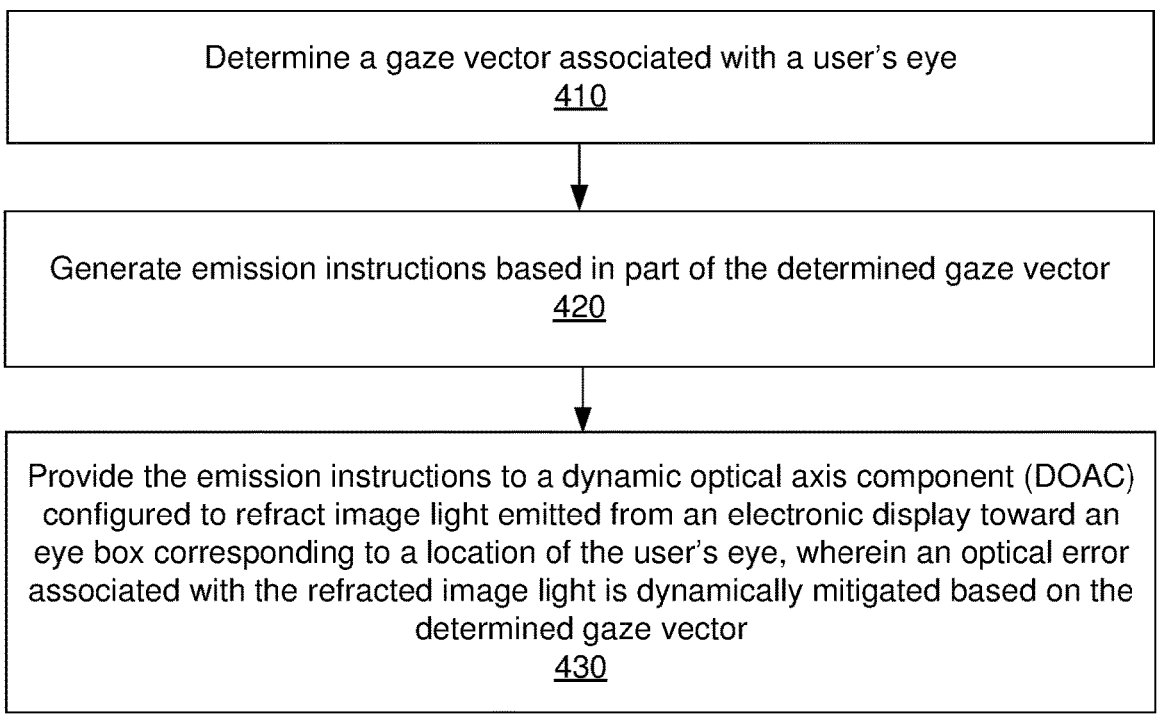
FIG. 4 is a flow chart illustrating a process of dynamically controlling optical axis location, in accordance with one or more embodiments.

FIG. 4 is a flow chart illustrating a process 400 for dynamically controlling optical axis location, which may be implemented at the HMD 200 in FIG. 2A, in accordance with one or more embodiments. The process 400 of FIG. 4 may be performed by components of a HMD, e.g., by the components of the dynamic optical axis system 300 in FIG. 3A. Other entities may perform some or all of the steps of the process in other embodiments. Likewise, embodiments may include different and/or additional steps, or perform the steps in different orders.

The HMD determines 410 (e.g., via an eye tracker) eye tracking information for a user's eye, i.e., a gaze vector of the user's eye. The eye tracker determines eye tracking information for the user's eye, which includes information about position and orientation of the user's eye in an eye box. The position and orientation of the user's eye in an eye box determines the gaze vector of the user's eye, i.e., position of a pupil of the user's eye.

The HMD generates 420 (e.g., via a controller) emission instructions based in part of the determined gaze vector. The emission instructions may comprise information about one or more voltage levels applied to a DOAC of an optical assembly to dynamically adjust location of an optical axis of the DOAC such that the optical axis tracks the determined gaze vector. In some embodiment, the optical axis tracks the gaze vector to be within a threshold distance from the gaze vector. In some other embodiments, the optical axis aligns (overlays) the gaze vector. By moving the optical axis of the DOAC in concert with the gaze vector of the user's eye, an optical error associated with image light refracted by the DOAC is reduced.

The HMD provides 430 (e.g., via the controller) the emission instructions to the DOAC configured to refract image light emitted from an electronic display toward an eye box corresponding to a location of the user's eye. An optical error associated with the refracted image light is dynamically mitigated based on the determined gaze vector. The HMD provides the emission instructions to the DOAC to dynamically move an optical axis of the DOAC to track the determined gaze vector, e.g., within a threshold distance.

In some embodiments, the HMD provides the emission instructions to the DOAC including at least one liquid crystal lens to dynamically move an optical axis of the DOAC to track the determined gaze vector. In one or more embodiments, the HMD provides the emission instructions to the DOAC to dynamically change location of a ring center associated with the at least one liquid crystal lens to align the ring center to the determined gaze vector (e.g., within a threshold distance). In one or more other embodiments, the HMD provides the emission instructions to the DOAC to control an electrical power in each electrode in an electrode pattern. In some embodiments, the HMD provides the emission instructions to the optical assembly including a non-Fresnel type lens to dynamically tune a thickness of the non-Fresnel type lens in accordance with the determined gaze vector to vary a focal length of the optical assembly. In some other embodiments, the HMD provides the emission instructions to the varifocal element including a multi-focal liquid crystal lens to dynamically vary a focal distance of the liquid crystal lens in accordance with the determined gaze vector.

System Environment

Figure 5:
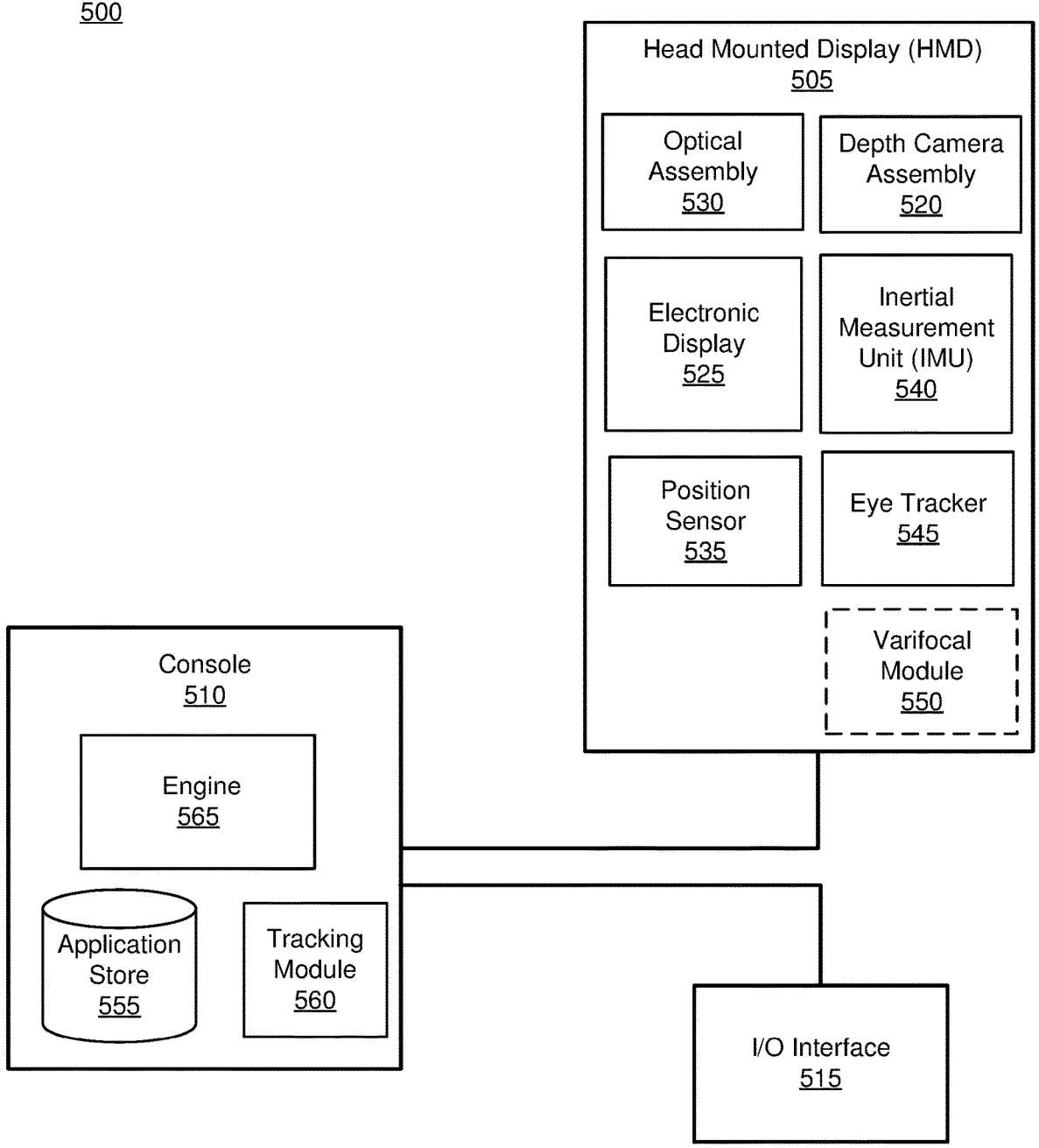
FIG. 5 is a block diagram of a HMD system in which a console operates, in accordance with one or more embodiments.

FIG. 5 is a block diagram of one embodiment of a HMD system 500 in which a console 510 operates. The HMD system 500 may operate in an artificial reality system. The HMD system 500 shown by FIG. 5 comprises a HMD 505 and an input/output (I/O) interface 515 that is coupled to the console 510. While FIG. 5 shows an example HMD system 500 including one HMD 505 and on I/O interface 515, in other embodiments any number of these components may be included in the HMD system 500. For example, there may be multiple HMDs 505 each having an associated I/O interface 515, with each HMD 505 and I/O interface 515 communicating with the console 510. In alternative configurations, different and/or additional components may be included in the HMD system 500. Additionally, functionality described in conjunction with one or more of the components shown in FIG. 5 may be distributed among the components in a different manner than described in conjunction with FIG. 5 in some embodiments. For example, some or all of the functionality of the console 510 is provided by the HMD 505.

The HMD 505 is a head-mounted display that presents content to a user comprising virtual and/or augmented views of a physical, real-world environment with computer-generated elements (e.g., two-dimensional (2D) or three-dimensional (3D) images, 2D or 3D video, sound, etc.). In some embodiments, the presented content includes audio that is presented via an external device (e.g., speakers and/or headphones) that receives audio information from the HMD 505, the console 510, or both, and presents audio data based on the audio information. The HMD 505 may comprise one or more rigid bodies, which may be rigidly or non-rigidly coupled together. A rigid coupling between rigid bodies causes the coupled rigid bodies to act as a single rigid entity. In contrast, a non-rigid coupling between rigid bodies allows the rigid bodies to move relative to each other. An embodiment of the HMD 505 may be the HMD 200 described above in conjunction with FIG. 2A.

The HMD 505 includes a DCA 520, an electronic display 525, an optical assembly 530, one or more position sensors 535, an IMU 540, an eye tracker 545, and an optional varifocal module 550. Some embodiments of the HMD 505 have different components than those described in conjunction with FIG. 5. Additionally, the functionality provided by various components described in conjunction with FIG. 5 may be differently distributed among the components of the HMD 505 in other embodiments.

The DCA 520 captures data describing depth information of a local area surrounding some or all of the HMD 505. The DCA 520 can compute the depth information using the data (e.g., based on a captured portion of a structured light pattern), or the DCA 520 can send this information to another device such as the console 510 that can determine the depth information using the data from the DCA 520. The DCA 520 may be an embodiment of the DCA 265 in FIG. 2B.

The electronic display 525 displays two-dimensional or three-dimensional images to the user in accordance with data received from the console 510. In various embodiments, the electronic display 525 comprises a single electronic display or multiple electronic displays (e.g., a display for each eye of a user). Examples of the electronic display 525 include: a LCD, an OLED display, an ILED display, an AMOLED display, a TOLED display, some other display, or some combination thereof. The electronic display 525 may be an embodiment of the electronic display 310 of FIG. 3A.

The optical assembly 530 magnifies image light received from the electronic display 525, corrects optical errors associated with the image light, and presents the corrected image light to a user of the HMD 505. The optical assembly 530 may include a plurality of optical elements. Example optical elements included in the optical assembly 530 include: an aperture, a Fresnel lens, a convex lens, a concave lens, a filter, a reflecting surface, or any other suitable optical element that affects image light. Moreover, the optical assembly 530 may include combinations of different optical elements. In some embodiments, one or more of the optical elements in the optical assembly 530 may have one or more coatings, such as partially reflective or anti-reflective coatings.

Magnification and focusing of the image light by the optical assembly 530 allows the electronic display 525 to be physically smaller, weigh less and consume less power than larger displays. Additionally, magnification may increase the field-of-view of the content presented by the electronic display 525. For example, the field-of-view of the displayed content is such that the displayed content is presented using almost all (e.g., approximately 110 degrees diagonal), and in some cases all, of the field-of-view. Additionally in some embodiments, the amount of magnification may be adjusted by adding or removing optical elements.

In some embodiments, the optical assembly 530 may be designed to correct one or more types of optical error. Examples of optical error include barrel or pincushion distortions, longitudinal chromatic aberrations, or transverse chromatic aberrations. Other types of optical errors may further include spherical aberrations, chromatic aberrations or errors due to the lens field curvature, astigmatisms, or any other type of optical error. In some embodiments, content provided to the electronic display 525 for display is pre-distorted, and the optical assembly 530 corrects the distortion when it receives image light from the electronic display 525 generated based on the content. The optical assembly 530 may be an embodiment of the optical assembly 250 in FIG. 2B and/or the optical assembly 310 in FIG. 3A.

The optical assembly 530 includes a DOAC positioned in front of the electronic display 525. The DOAC of the optical assembly 530 is configured to refract image light received from the electronic display 525. Location of an optical axis of the DOAC can be dynamically adjusted based on a gaze vector of a user's eye determined by the eye tracker 545. Location of the optical axis of the DOAC may be adjusted such that an optical error associated with refracted image light reaching an eye box of the user's eye is reduced, thus mitigating user's viewing discomfort. An optical axis of the DOAC of the optical assembly 530 may dynamically move to align (e.g., within a defined threshold distance) with the determined gaze vector of the user's eye.

In some embodiments, the DOAC of the optical assembly 530 includes at least one liquid crystal lens having a movable optical axis. The optical axis of the at least one liquid crystal lens may be dynamically adjusted to align (e.g., within a threshold distance) with the determined gaze vector of the user's eye. In one or more embodiments, the DOAC includes the at least one liquid crystal lens having a plurality of ring sections. Location of a ring center of each ring section (and hence an optical center of the DOAC) may dynamically change based on the determined gaze vector. The DOAC of the optical assembly 530 may be an embodiment of the DOAC 315 of the optical assembly 310 in FIG. 3A.

The IMU 540 is an electronic device that generates data indicating a position of the HMD 505 based on measurement signals received from one or more of the position sensors 535 and from depth information received from the DCA 520. A position sensor 535 generates one or more measurement signals in response to motion of the HMD 505. Examples of position sensors 535 include: one or more accelerometers, one or more gyroscopes, one or more magnetometers, another suitable type of sensor that detects motion, a type of sensor used for error correction of the IMU 540, or some combination thereof. The position sensors 535 may be located external to the IMU 540, internal to the IMU 540, or some combination thereof.

Based on the one or more measurement signals from one or more position sensors 535, the IMU 540 generates data indicating an estimated current position of the HMD 505 relative to an initial position of the HMD 505. For example, the position sensors 535 include multiple accelerometers to measure translational motion (forward/back, up/down, left/right) and multiple gyroscopes to measure rotational motion (e.g., pitch, yaw, roll). In some embodiments, the position sensors 535 may represent the position sensors 235 of FIG. 2A. In some embodiments, the IMU 540 rapidly samples the measurement signals and calculates the estimated current position of the HMD 505 from the sampled data. For example, the IMU 540 integrates the measurement signals received from the accelerometers over time to estimate a velocity vector and integrates the velocity vector over time to determine an estimated current position of a reference point on the HMD 505. Alternatively, the IMU 540 provides the sampled measurement signals to the console 510, which interprets the data to reduce error. The reference point is a point that may be used to describe the position of the HMD 505. The reference point may generally be defined as a point in space or a position related to the HMD's 505 orientation and position.

The IMU 540 receives one or more parameters from the console 510. The one or more parameters are used to maintain tracking of the HMD 505. Based on a received parameter, the IMU 540 may adjust one or more IMU parameters (e.g., sample rate). In some embodiments, certain parameters cause the IMU 540 to update an initial position of the reference point so it corresponds to a next position of the reference point. Updating the initial position of the reference point as the next calibrated position of the reference point helps reduce accumulated error associated with the current position estimated the IMU 540. The accumulated error, also referred to as drift error, causes the estimated position of the reference point to "drift" away from the actual position of the reference point over time. In some embodiments of the HMD 505, the IMU 540 may be a dedicated hardware component. In other embodiments, the IMU 540 may be a software component implemented in one or more processors. The IMU 540 may be an embodiment of the IMU 230 in FIG. 2A.

The eye tracker 545 determines eye tracking information for an eye of a user wearing the HMD 505. The eye tracking information determined by the eye tracking system 545 may comprise information about an orientation of the user's eye, i.e., information a gaze vector of the user's eye. In some embodiments, the eye tracker 545 is integrated into the optical assembly 530. An embodiment of the eye tracker 545 may comprise an illumination source and an imaging device (camera). The eye tracker 545 is configured to track the gaze vector of the user's eye over a time period. The eye tracker 545 may provide information about the tracked gaze vector to a module of the HMD 505 or to the console 510. The eye tracker 545 may be an embodiment of the eye tracker 320 in FIG. 3A.

In some embodiments, the varifocal module 550 is further integrated into the HMD 505. The varifocal module 550 may be coupled to the eye tracking system 545 to obtain eye tracking information determined by the eye tracking system 545. The varifocal module 550 may be configured to adjust focus of one or more images displayed on the electronic display 525, based on the determined eye tracking information obtained from the eye tracking system 545. In this way, the varifocal module 550 can mitigate vergence-accommodation conflict in relation to image light. The varifocal module 550 can be interfaced (e.g., either mechanically or electrically) with at least one of the electronic display 525 and at least one optical element of the optical assembly 530. Then, the varifocal module 550 may be configured to adjust focus of the one or more images displayed on the electronic display 525 by adjusting position of at least one of the electronic display 525 and the at least one optical element of the optical assembly 530, based on the determined eye tracking information obtained from the eye tracking system 545. By adjusting the position, the varifocal module 550 varies focus of image light output from the electronic display 525 towards the user's eye. The varifocal module 550 may be also configured to adjust resolution of the images displayed on the electronic display 525 by performing foveated rendering of the displayed images, based at least in part on the determined eye tracking information obtained from the eye tracking system 545. In this case, the varifocal module 550 provides appropriate image signals to the electronic display 525. The varifocal module 550 provides image signals with a maximum pixel density for the electronic display 525 only in a foveal region of the user's eye-gaze, while providing image signals with lower pixel densities in other regions of the electronic display 525. In one embodiment, the varifocal module 550 may utilize the depth information obtained by the DCA 520 to, e.g., generate content for presentation on the electronic display 525. In some embodiments, the varifocal module 550 may be a component integrated into the optical assembly 530.

The I/O interface 515 is a device that allows a user to send action requests and receive responses from the console 510. An action request is a request to perform a particular action. For example, an action request may be an instruction to start or end capture of image or video data or an instruction to perform a particular action within an application. The I/O interface 515 may include one or more input devices. Example input devices include: a keyboard, a mouse, a game controller, or any other suitable device for receiving action requests and communicating the action requests to the console 510. An action request received by the I/O interface 515 is communicated to the console 510, which performs an action corresponding to the action request. In some embodiments, the I/O interface 515 includes an IMU 540 that captures IMU data indicating an estimated position of the I/O interface 515 relative to an initial position of the I/O interface 515. In some embodiments, the I/O interface 515 may provide haptic feedback to the user in accordance with instructions received from the console 510. For example, haptic feedback is provided when an action request is received, or the console 510 communicates instructions to the I/O interface 515 causing the I/O interface 515 to generate haptic feedback when the console 510 performs an action.

The console 510 provides content to the HMD 505 for processing in accordance with information received from one or more of: the DCA 520, the HMD 505, and the I/O interface 515. In the example shown in FIG. 5, the console 510 includes an application store 555, a tracking module 560, and an engine 565. Some embodiments of the console 510 have different modules or components than those described in conjunction with FIG. 5. Similarly, the functions further described below may be distributed among components of the console 510 in a different manner than described in conjunction with FIG. 5.

The application store 555 stores one or more applications for execution by the console 510. An application is a group of instructions, that when executed by a processor, generates content for presentation to the user. Content generated by an application may be in response to inputs received from the user via movement of the HMD 505 or the I/O interface 515. Examples of applications include: gaming applications, conferencing applications, video playback applications, or other suitable applications.

The tracking module 560 calibrates the HMD system 500 using one or more calibration parameters and may adjust one or more calibration parameters to reduce error in determination of the position of the HMD 505 or of the I/O interface 515. For example, the tracking module 560 communicates a calibration parameter to the DCA 520 to adjust the focus of the DCA 520 to more accurately determine positions of structured light elements captured by the DCA 520. Calibration performed by the tracking module 560 also accounts for information received from the IMU 540 in the HMD 505 and/or an IMU 540 included in the I/O interface 515. Additionally, if tracking of the HMD 505 is lost (e.g., the DCA 520 loses line of sight of at least a threshold number of structured light elements), the tracking module 560 may re-calibrate some or all of the HMD system 500.

The tracking module 560 tracks movements of the HMD 505 or of the I/O interface 515 using information from the DCA 520, the one or more position sensors 535, the IMU 540 or some combination thereof. For example, the tracking module 560 determines a position of a reference point of the HMD 505 in a mapping of a local area based on information from the HMD 505. The tracking module 560 may also determine positions of the reference point of the HMD 505 or a reference point of the I/O interface 515 using data indicating a position of the HMD 505 from the IMU 540 or using data indicating a position of the I/O interface 515 from an IMU 540 included in the I/O interface 515, respectively. Additionally, in some embodiments, the tracking module 560 may use portions of data indicating a position or the HMD 505 from the IMU 540 as well as representations of the local area from the DCA 520 to predict a future location of the HMD 505. The tracking module 560 provides the estimated or predicted future position of the HMD 505 or the I/O interface 515 to the engine 555.

The engine 565 generates a 3D mapping of the area surrounding some or all of the HMD 505 (i.e., the "local area") based on information received from the HMD 505. In some embodiments, the engine 565 determines depth information for the 3D mapping of the local area based on information received from the DCA 520 that is relevant for techniques used in computing depth. The engine 565 may calculate depth information using one or more techniques in computing depth from structured light. In various embodiments, the engine 565 uses the depth information to, e.g., update a model of the local area, and generate content based in part on the updated model.

The engine 565 also executes applications within the HMD system 500 and receives position information, acceleration information, velocity information, predicted future positions, or some combination thereof, of the HMD 505 from the tracking module 560. Based on the received information, the engine 565 determines content to provide to the HMD 505 for presentation to the user. For example, if the received information indicates that the user has looked to the left, the engine 565 generates content for the HMD 505 that mirrors the user's movement in a virtual environment or in an environment augmenting the local area with additional content. Additionally, the engine 565 performs an action within an application executing on the console 510 in response to an action request received from the I/O interface 515 and provides feedback to the user that the action was performed. The provided feedback may be visual or audible feedback via the HMD 505 or haptic feedback via the I/O interface 515.

In some embodiments, based on the eye tracking information (e.g., orientation of the user's eye) received from the eye tracker 545, the engine 565 determines resolution of the content provided to the HMD 505 for presentation to the user. The engine 565 provides the content to the HMD 505 having a maximum pixel resolution on the electronic display 525 in a foveal region of the user's gaze, whereas the engine 565 provides a lower pixel resolution in other regions of the electronic display 525, thus achieving less power consumption at the HMD 505 and saving computing cycles of the console 510 without compromising a visual experience of the user. In some embodiments, the engine 565 can further use the eye tracking information to adjust where objects are displayed on the electronic display 525 to mitigate vergence-accommodation conflict.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. An optical system comprising:
an optical component; and
a controller configured to:
track a gaze direction for an eye, and
adjust a location of an optical axis of the optical component based on the tracked gaze direction.

2. The optical system of claim 1, wherein the optical component is configured to:
refract light incident on a surface of the optical component having the adjusted location of the optical axis, and
direct the refracted light toward the eye.

3. The optical system of claim 2, wherein the optical component is further configured to:
adjust focus of the refracted light such that the refracted light reaching an eye box of the eye is in focus at the tracked gaze direction.

4. The optical system of claim 1, wherein the controller is further configured to:
generate instructions based on information about the tracked gaze direction; and
provide the instructions to the optical component to adjust the location of the optical axis based on the tracked gaze direction.

5. The optical system of claim 1, wherein the optical axis of the optical component is adjusted to be within a threshold distance from the tracked gaze direction.

6. The optical system of claim 1, wherein the optical axis of the optical component is adjusted to align with the tracked gaze direction.

7. The optical system of claim 1, wherein the optical component comprises at least one liquid crystal lens having the optical axis that is adjusted to align with the tracked gaze direction.

8. The optical system of claim 1, wherein the controller is further configured to:
generate instructions based on information about the tracked gaze direction; and
control, based in part on the instructions, a voltage level applied to each electrode in an electrode pattern of the optical component to adjust the location of the optical axis.

9. The optical system of claim 1, wherein the optical component includes at least one liquid crystal lens having a plurality of concentric ring sections, and the controller is further configured to:
generate instructions based on information about the tracked gaze direction; and
control, based in part on the instructions, a location of a ring center of the concentric ring sections to adjust the location of the optical axis.

10. The optical system of claim 9, wherein the controller is further configured to:
control, based in part on the instructions, a location of the ring center to be within a threshold distance from the tracked gaze direction.

11. The optical system of claim 1, wherein the optical system is part of a head-mounted display.

12. A method comprising:
tracking a gaze direction for an eye; and
adjusting a location of an optical axis of an optical component based on the tracked gaze direction.

13. The method of claim 12, further comprising:
generating instructions based on information about the tracked gaze direction; and
providing the instructions to the optical component to adjust the location of the optical axis based on the tracked gaze direction.

14. The method of claim 12, further comprising:
generating instructions based on information about the tracked gaze direction; and
providing the instructions to the optical component to adjust the location of the optical axis to be within a threshold distance from the tracked gaze direction.

15. The method of claim 12, further comprising:
generating instructions based on information about the tracked gaze direction; and
providing the instructions to the optical component to adjust the location of the optical axis to align with the tracked gaze direction.

16. The method of claim 12, wherein the optical component comprises at least one liquid crystal lens, and the method further comprising:
generating instructions based on information about the tracked gaze direction; and
providing the instructions to the at least one liquid crystal lens to adjust the location of the optical axis to align with the tracked gaze direction.

17. The method of claim 12, further comprising:
generating instructions based on information about the tracked gaze direction; and
controlling, based in part on the instructions, a voltage level applied to each electrode in an electrode pattern of the optical component to adjust the location of the optical axis.

18. The method of claim 12, wherein the optical component includes at least one liquid crystal lens having a plurality of concentric ring sections, and the method further comprising:
generating instructions based on information about the tracked gaze direction; and
controlling, based in part on the instructions, a location of a ring center of the concentric ring sections to adjust the location of the optical axis to be within a threshold distance from the tracked gaze direction.

19. A computer program product comprising a computer-readable storage medium having instructions encoded thereon that, when executed by one or more processors cause the one or more processors to:
track a gaze direction for an eye;
generate emission instructions based on information about the tracked gaze direction; and
provide the emission instructions to an optical component to adjust the location of the optical axis based on the tracked gaze direction.

20. The computer program product of claim 19, wherein the optical component comprises at least one liquid crystal lens, and the instructions further cause the one or more processors to:
provide the emission instructions to the at least one liquid crystal lens to adjust the location of the optical axis to be within a threshold distance from the tracked gaze direction.

* * * * *